(12) United States Patent
Michioka et al.

(10) Patent No.: US 7,785,010 B2
(45) Date of Patent: Aug. 31, 2010

(54) GUIDE APPARATUS

(75) Inventors: Hidekazu Michioka, Tokyo (JP);
Daisuke Yatsushiro, Tokyo (JP);
Tadashi Hirokawa, Tokyo (JP);
Yoshiaki Saito, Tokyo (JP)

(73) Assignee: THK Co., Ltd., Tokyo (JP)

( * ) Notice: Subject to any disclaimer, the term of this patent is extended or adjusted under 35 U.S.C. 154(b) by 993 days.

(21) Appl. No.: 10/579,991

(22) PCT Filed: Nov. 19, 2004

(86) PCT No.: PCT/JP2004/017633

§ 371 (c)(1),
(2), (4) Date: Oct. 12, 2006

(87) PCT Pub. No.: WO2005/050040

PCT Pub. Date: Jun. 2, 2005

(65) Prior Publication Data

US 2007/0269148 A1 Nov. 22, 2007

(30) Foreign Application Priority Data

Nov. 20, 2003 (JP) ............................. 2003-391215

(51) Int. Cl.
*F16C 29/08* (2006.01)
(52) U.S. Cl. ......................................... 384/15; 277/355
(58) Field of Classification Search .................... 384/15, 384/43, 45; 277/355
See application file for complete search history.

(56) References Cited

U.S. PATENT DOCUMENTS 3,494,673 A * 2/1970 Wilcox .................. 384/15

5,634,722 A   6/1997 Yuasa et al.

(Continued)

FOREIGN PATENT DOCUMENTS

DE   199 61 225 A1   6/2001

(Continued)

OTHER PUBLICATIONS

International Search Report mailed Feb. 15, 2005 of International Application PCT/JP2004/017633.

(Continued)

*Primary Examiner*—William C Joyce
(74) *Attorney, Agent, or Firm*—Westerman, Hattori, Daniels & Adrian, LLP

(57) ABSTRACT

In order to provide a long-life, highly-reliable guide apparatus which exhibits dustproof performance and prevents intrusion of dust into the moving block in environments where there are lots of fine dust such as gypsum and ceramic powder and where no oil contents or oil contents are not liked, there is provided a guide apparatus having a track rail 11, in which rolling-element raceway grooves 12-1 to 12-4 are formed along a longitudinal direction thereof, and a moving block 20 attached to the track rail by way of a plurality of rolling elements in a relatively-movable manner, wherein an end-face dustproof brush 25, which has a brush member 36 whose tip end contacts a surface of the track rail 11 and which eliminates extraneous matters adhering to the surface of the track rail 11 by means of the brush member 36, is attached to outside of each of the side covers 22 with respect to the direction of relative movement.

13 Claims, 9 Drawing Sheets

U.S. PATENT DOCUMENTS

2002/0027044 A1 3/2002 Michioka et al.
2002/0134622 A1 9/2002 Michioka et al.

FOREIGN PATENT DOCUMENTS

| | | | |
|---|---|---|---|
| JP | 6-62224 | | 9/1994 |
| JP | 08-121411 | * | 5/1996 |
| JP | 9-42284 | | 2/1997 |
| JP | 2000-227115 | | 8/2000 |

OTHER PUBLICATIONS

Office Action dated Sep. 21, 2007 issued in corresponding Chinese Application No. 2004 80034147.7.

* cited by examiner

CROSS-SECTIONAL PROFILE WHEN VIEWED IN
DIRECTION OF ARROWS A-A SHOWN IN FIG.3

CROSS-SECTIONAL PROFILE WHEN VIEWED IN
DIRECTION OF ARROWS B-B SHOWN IN FIG.3

GUIDE APPARATUS

TECHNICAL FIELD

The present invention relates to a guide apparatus having a raceway track rail and a moving block that is attached to the raceway track rail by way of rolling elements so as to be relatively movable, as well as to a guide apparatus suitable for use in environments where a great amount of fine dust is present.

the term "relatively movable" employed herein signifies relative movement between the moving block and the raceway track rail, as in a case where a raceway track rail is fixed and a moving block is made movable, a case where the moving block is fixed and the raceway track rail is made movable, or the like.

BACKGROUND ART

There is available a guide apparatus having a moving block 102 which is attached to a raceway track rail 101 by way of a plurality of rolling elements (balls or rollers) so as to be relatively movable, as shown in FIG. 1.
(see JP-A-2000-227115)

In such a guide apparatus, the moving block 102 comprises a moving block main body 103 assembled astride the raceway track rail 101; side covers 104, 104 attached, while straddling the raceway track rail 101, to both ends of the moving block main body with respect to a direction of relative movement thereof; lubricant feeders 105, 105 attached, while straddling the raceway track rail 101, to the outsides of the respective side covers 104, 104 in the direction of relative movement; and dustproof members 106, 106 attached, while straddling the raceway track rail 101, to the outside of the respective lubricant feeders 105, 105 in the direction of relative movement.

The dustproof members 106, 106 exhibit the effect of preventing intrusion of extraneous matters into the moving block 102 from interstices between side faces (an upper surface and both side surfaces) of the raceway track rail 101 and inner peripheral surfaces of the respective ends of the moving block 102. Each of the dustproof members 106, 106 is formed from an elastic member impregnated with lubricant and a reinforcement member used for interposing the elastic member between each of the dustproof members and the corresponding lubricant feeder 105.

DISCLOSURE OF THE INVENTION

As mentioned above, each of the dustproof members 106, 106 of the related-art guiding apparatus has an elastic member impregnated with lubricant. Hence, in environments where great amounts of fine dust such as gypsum and ceramic powder are present, the dust and the lubricant are mixed together to thus solidify, which poses a problem of early breakage of the guide apparatus.

The present invention has been conceived in light of the above point and aims at providing a long-life, highly-reliable guide apparatus which exhibits dustproof performance and prevents intrusion of dust into the moving block in environments where great amounts of fine dust such as gypsum and ceramic powder are present and where any oil content is undesirable.

In order to solve the drawbacks, a first aspect provides a guide apparatus having a track rail, on which rolling-element raceway surfaces are formed along a longitudinal direction thereof, and a moving block attached to the track rail by way of a plurality of rolling elements in a relatively-movable manner, the moving block having load rolling-element raceway surfaces forming load rolling-element raceway passages in conjunction with the rolling-element raceway surfaces, a moving block main body in which rolling-element clearance holes corresponding to the load rolling-element raceway surfaces are formed, and side covers attached to the respective ends of the moving block main body with respect to the direction of relative movement, wherein an end-face dustproof brush, which has a brush member whose tip end contacts a surface of the track rail and which eliminates extraneous matters adhering to the surface of the track rail by means of the brush member, is attached to outside of each of the side covers with respect to the direction of relative movement.

A second aspect is based on the guide apparatus of the first aspect and is characterized in that the end-face dustproof brush has a casing and a plurality of the brush members, and the plurality of brush members are provided in the casing while being separated from each other at a given interval with reference to the direction of relative movement.

A third aspect is based on the guide apparatus of the second aspect and is characterized in that, of the plurality of brush members of the end-face dustproof brush, the brush members located at outer positions with reference to the direction of relative movement have a large wire diameter; brush wires having high hardness are arranged sparsely; the brush members provided at inner positions are finer than the outer brush wires in terms of wire diameter; and brush wires having low hardness are arranged densely.

A fourth aspect is based on the guide apparatus of the first to third aspects and is characterized in that each of the brush members of the end-face dustproof brush conforms to a cross-sectional profile of the track rail, and each brush member is formed from a plurality of split brush bodies so that tip ends of the brush bodies can contact the surface of the track rail without fail.

A fifth aspect is based on the guide apparatus of the first to fourth aspects and is characterized in that an accessory member, such as another seal member, is provided between the end-face dustproof brush and the side cover.

A sixth aspect is based on the guide apparatus of the first to fifth aspects and is characterized in that the moving block main body is provided with a side dustproof brush whose tip ends contact a longitudinal side surface of the track rail and which closes clearance between the side surface of the track rail and a longitudinal inner side surface of the moving block.

According to the first aspect, an end-face dustproof brush, which has a brush member whose tip end contacts a surface of the track rail and which eliminates extraneous matters adhering to the surface of the track rail by means of the brush member, is attached to the outside of each of the side covers with respect to the direction of relative movement. Accordingly, extraneous matters having adhered to the surface of the track rail are wiped away by the brush member, and hence intrusion of the extraneous matters into the moving block is prevented.

According to the second aspect, the end-face dustproof brush has a casing and the plurality of brush members, and the plurality of brush members are provided in the casing while being separated from each other at a given interval with reference to the direction of relative movement. The extraneous matters that have not been wiped away by a preceding brush member are temporarily released in an interval space between the preceding brush member and a subsequent brush member, and the extraneous matters are then wiped by the subsequent brush member. Hence, the rate of removal of the extraneous matter is enhanced.

According to the third aspect, of the plurality of brush members of the end-face dustproof brush, the brush members located at outer positions with reference to the direction of relative movement have a large wire diameter; brush wires having high hardness are arranged sparsely; the brush members provided at inner positions are finer than the outer brush wires in terms of a wire diameter; and brush wires having low hardness are arranged densely. Comparatively-large extraneous matters having adhered to the surface of the track rail are wiped away by the brush members provided at outer positions. Fine extraneous matters, which cannot have been eliminated by the outer brush members, can be eliminated as being wiped away by means of the brush members which are provided at an inner position and has a low wire diameter and low hardness are provided densely. Hence, the rate of removal of the extraneous matter is enhanced.

According to the fourth aspect, each of the brush members of the end-face dustproof brush conforms to a cross-sectional profile of the track rail, and each brush member is formed from a plurality of split brush bodies so that tip ends of the brush bodies can contact the surface of the track rail without fail. Hence, the rate of removal of the extraneous matter is enhanced.

According to the fifth aspect, an accessory member, such as another seal member, is provided between the end-face dustproof brush and the side cover. Extraneous matters which intrude the accessory member can also be eliminated, so that the function of the guide apparatus can be maintained in a good condition.

According to the sixth aspect, the moving block main body is provided with a side dustproof brush whose tip ends contact a longitudinal side surface of the track rail and which closes clearance between the side surface of the track rail and a longitudinal inner side surface of the moving block. Intrusion of extraneous matters into the clearance between the inner overall peripheral surface of the moving block and the surface (an upper surface and both side surfaces) of the track rail can be prevented along with the end-face dustproof brush, so that the function of the guide apparatus can be maintained in a much better condition.

Figure 1:
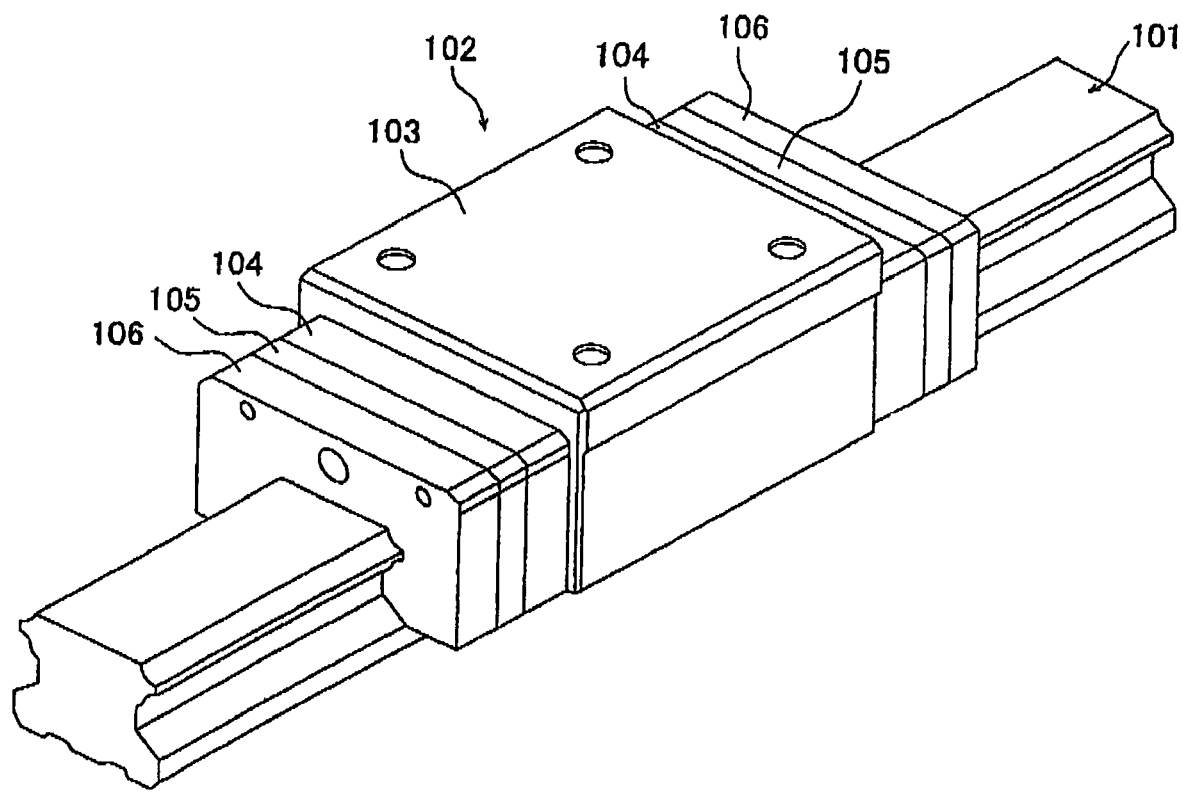
FIG. 1 is an exterior perspective view showing an example configuration of a related-art guide apparatus.

In the drawings, reference numeral 11 designates a raceway track rail; 12 designates a rolling-element raceway groove; 20 designates a moving block; 21 designates a moving block main body; 22 designates a side cover; 23 designates an intermediate plate; 24 designates a dustproof member; 25 designates an end-face dustproof brush; 26 designates a cover; 27 designates a load rolling-element raceway groove; 28 designates a skirt section; 29 designates a rolling-element clearance hole; 30 designates a rolling-element reversal-of-direction passage; 31 designates a load rolling-element raceway passage; 32 designates a rolling element (ball); 33 designates a side dustproof brush; 34 designates a machine screw; 35 designates a bush casing; and 36 designates a brush member.

BEST MODE FOR CARRYING OUT THE INVENTION

Figure 2:
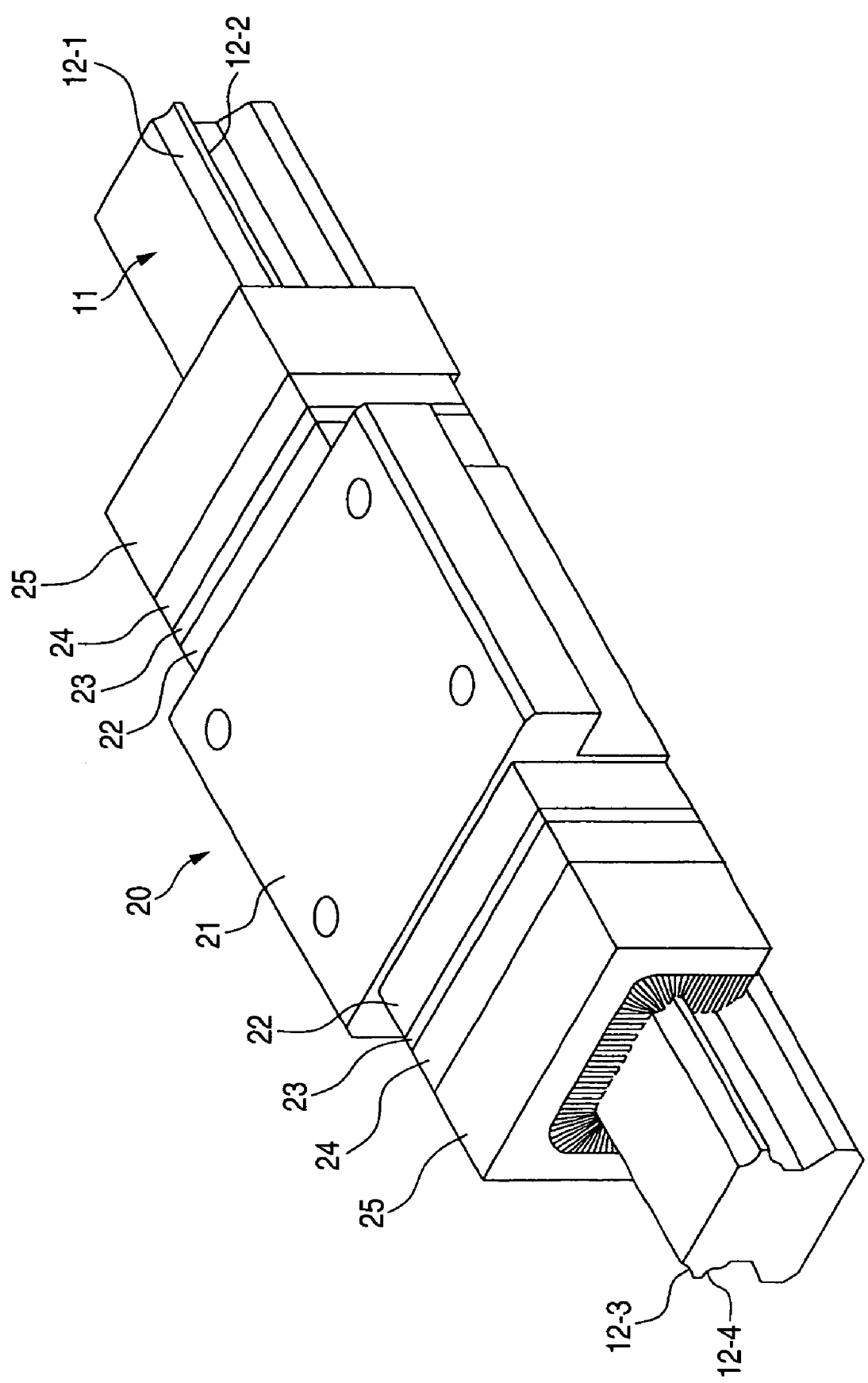
FIG. 2 is an exterior perspective view showing the example configuration of the guide apparatus according to the present invention.
Figure 3:
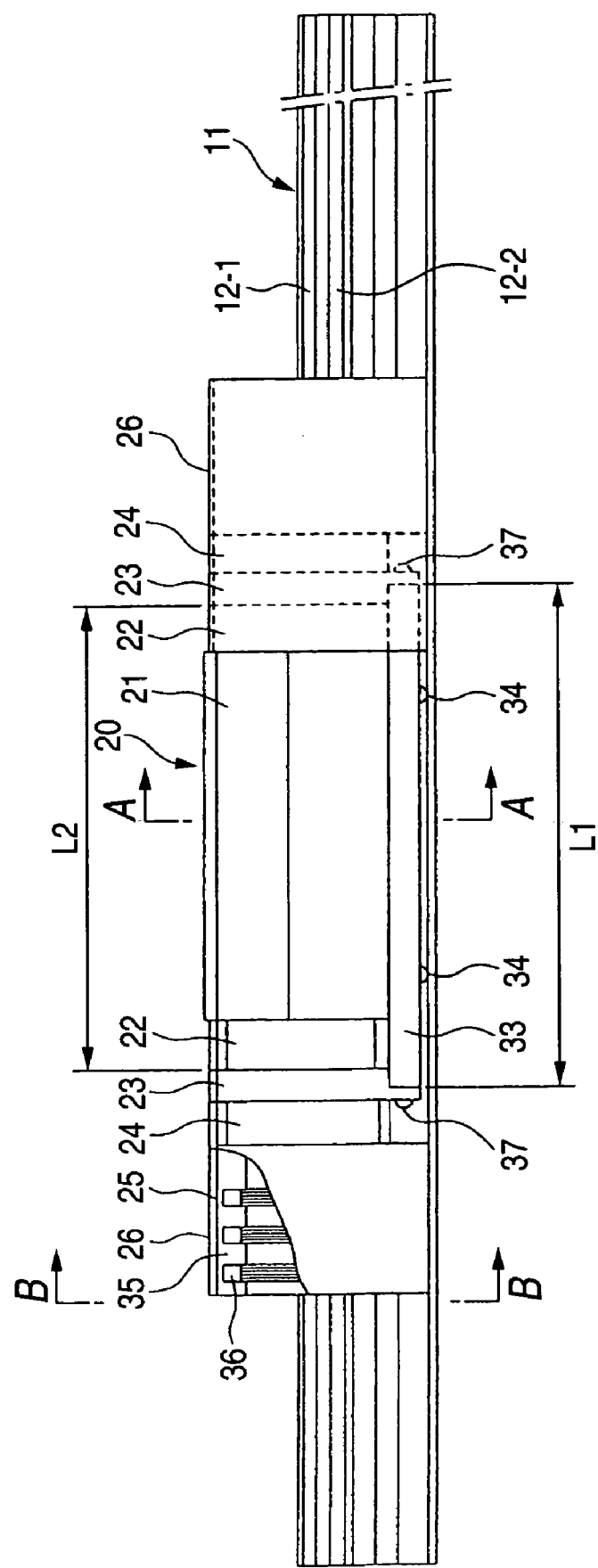
FIG. 3 is a fragmentary cutout side view showing the example configuration of the guide apparatus according to the present invention.
Figure 4:
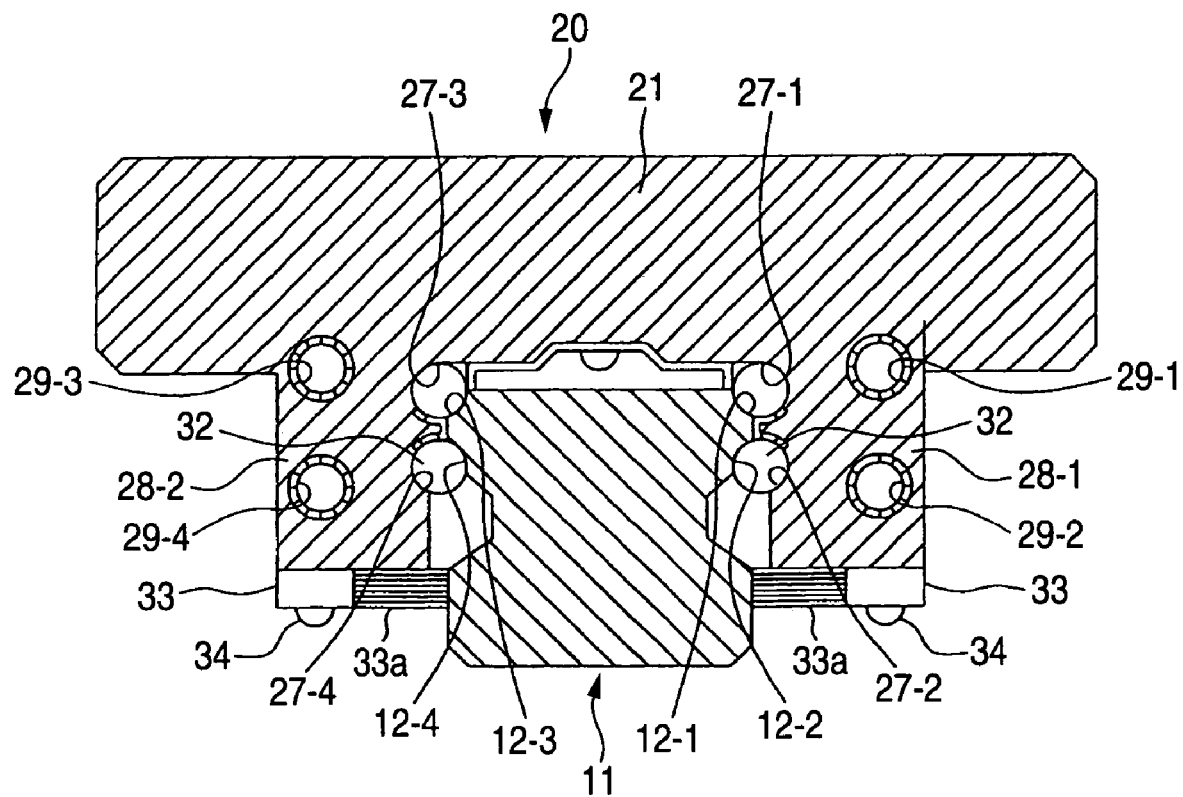
FIG. 4 is a cross-sectional profile when viewed in the direction of arrows A-A shown in FIG. 3.
Figure 5:
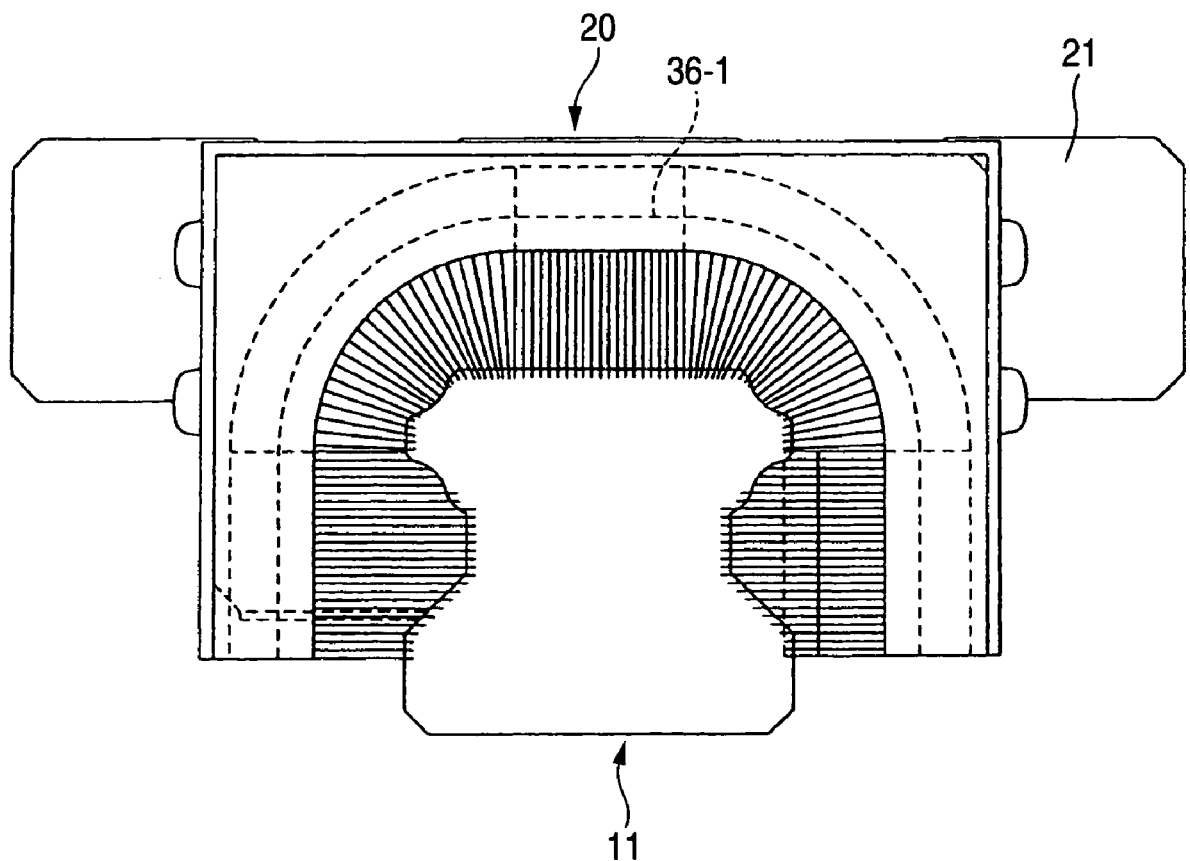
FIG. 5 is a cross-sectional profile when viewed in the direction of arrows B-B shown in FIG. 3.
Figure 6:
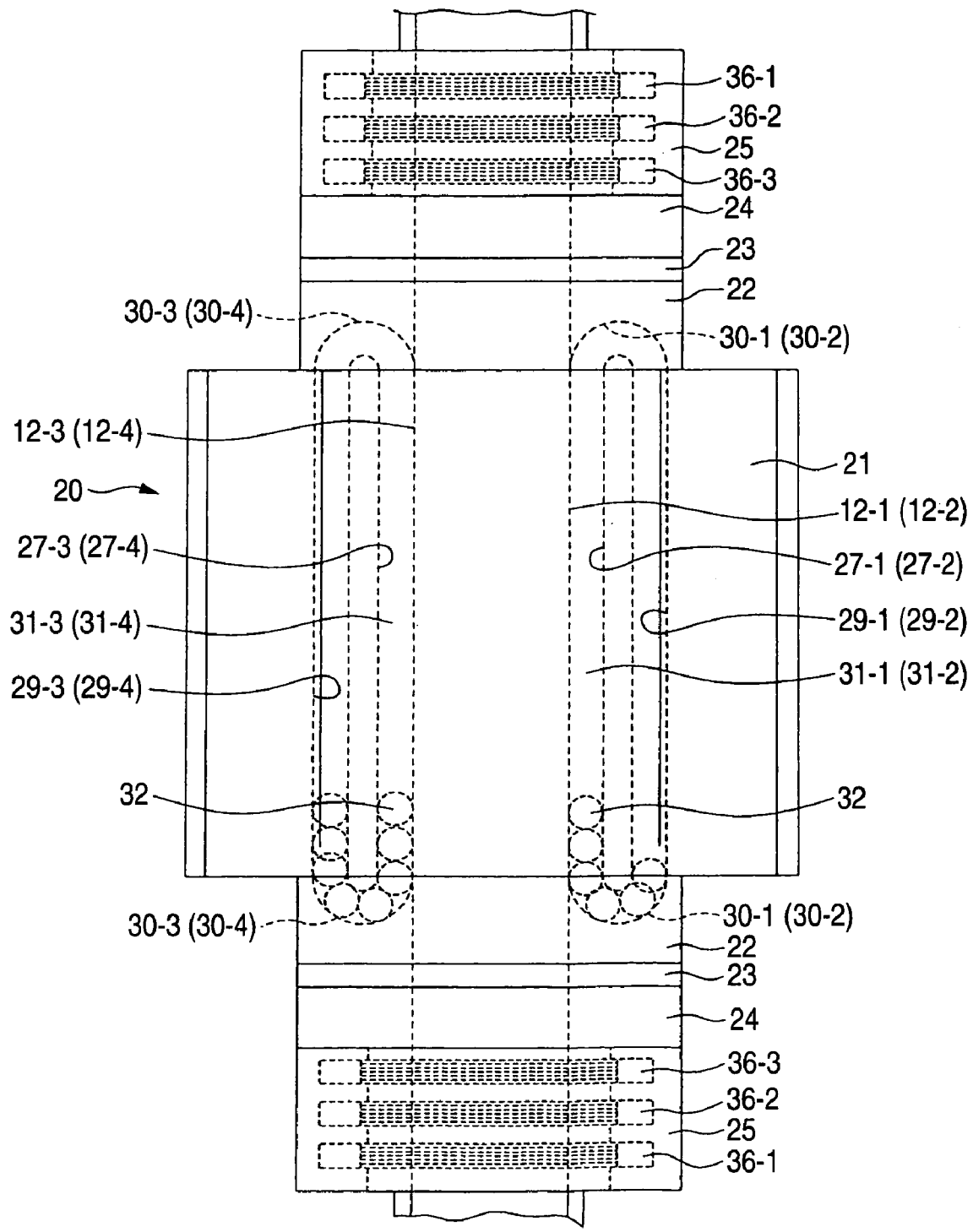
FIG. 6 is a plan view showing an example configuration of a moving block of the guide apparatus according to the present invention.

An embodiment of the present invention will be described hereunder by reference to the drawings. FIGS. 2 through 6 are views showing the configuration of a guide apparatus according to the present invention. FIG. 2 is an exterior perspective view; FIG. 3 is fragmentary cutout side view; FIG. 4 is a cross-sectional profile when viewed from a direction of arrows A-A in FIG. 3; FIG. 5 is a cross-sectional profile when viewed from the direction of arrows B-B shown in FIG. 3, and FIG. 6 is a plan view of a moving block. Reference numeral 11 designates a raceway track rail. A plurality of (four in the drawing) rolling-element raceway grooves 12-1 to 12-4, along which moving elements (balls) roll in a longitudinal direction, are formed in the raceway track rail 11.

Reference numeral 20 designates a moving block attached to the raceway track rail 11 in a movable manner. The moving block 20 comprises a moving block main body 21; side covers 22, 22 attached to both ends of the moving block main body 21 with respect to the moving direction thereof; intermediate plates 23, 23 attached to the outside of the respective side covers 22, 22 with respect to the moving direction thereof; dustproof members 24, 24 attached to the outside of the respective intermediate plates 23, 23 with respect to the moving direction thereof; and end-face dustproof brushes 25, 25 attached to the outside of the respective dustproof members 24, 24 with respect to the moving direction thereof.

As shown in FIG. 4, the moving block main body 21 assumes a shape whose cross-sectional profile perpendicular to the longitudinal direction of the raceway track rail 11 is the shape of the letter C and which has skirt sections 28-1, 28-2 formed at both opening portions of the moving block main body; and is to be assembled so as to straddle the raceway track rail 11.

As illustrated, a plurality of (four in the drawing) load rolling-element raceway grooves 27-1 to 27-4, which constitute load rolling-element raceway passages 31-1 to 31-4 in conjunction with the rolling-element raceway grooves 12-1 to 12-4 formed in the raceway track rail 11, are formed in the moving block main body 21. Rolling-element clearance holes 29-1 to 29-4, which are equal in number to the load rolling-element raceway grooves 27-1 to 27-4, are formed in the moving block main body.

Each of the side covers 22, whose cross-sectional profile perpendicular to the longitudinal direction of the raceway track rail 11 is the shape of the letter C, is attached to each end of the moving block main body 21 while straddling the raceway track rail 11.

The below elements are formed in the side covers 22, 22: that is, rolling-element reversal-of-direction passages 30-1, 30-1, by means of bringing the rolling-element clearance hole 29-1 into mutual communication with the load rolling element raceway passage 31-1, consisting of the rolling-element raceway groove 12-1 of the track rail 11 and the load rolling-element raceway groove 27-1 of the moving block main body 21, to thus constitute a rolling-element circulation passage; rolling-element reversal-of-direction passages 30-2, 30-2, by means of bringing the rolling-element clearance hole 29-2 into mutual communication with the load rolling element raceway passage 31-2, consisting of the rolling-element raceway groove 12-2 of the track rail 11 and the load rolling-element raceway groove 27-2 of the moving block main body 21, to thus constitute a rolling-element circulation passage; rolling-element reversal-of-direction passages 30-3, 30-3, by means of bringing the rolling-element clearance hole 29-3 into mutual communication with the load rolling element raceway passage 31-3, consisting of the rolling-element raceway groove 12-3 of the track rail 11 and the load rolling-element raceway groove 27-3 of the moving block main body 21, to thus constitute a rolling-element circulation passage; and rolling-element reversal-of-direction passages 30-4, 30-4, by means of bringing the rolling-element clearance hole 29-4 into mutual communication with the load rolling element raceway passage 31-4, consisting of the rolling-element raceway groove 12-4 of the track rail 11 and the load rolling-element raceway groove 27-4 of the moving block main body 21, to thus constitute a rolling-element circulation passage.

The rolling elements (balls) 32 circulate through the inside of the rolling-element circulation passage in association with relative movement between the track rail 11 and the moving block 20.

Each of the intermediate plates 23, 23 is a plate interposed between the side cover 22 and each of the end-face dustproof brushes 25, 25. The intermediate plate assumes a C-shaped cross-sectional profile orthogonal to the longitudinal direction of the track rail 11; is attached to the outside of each of the side covers 22, 22 with respect to the travel direction of the side cover while straddling the track rail 11; and remains out of contact with the surface of the track rail 11.

The dustproof members 24, 24 are for preventing intrusion of the extraneous matters adhering to the surface of the track rail 11 into the moving block 20. The cross-sectional profile of the dustproof member 24 orthogonal to the longitudinal direction of the track rail 11 assumes the shape of the letter C. The dustproof member is attached, while straddling the track rail 11, to the outside of each of the intermediate plates 23, 23 with respect to the traveling direction, and an inner peripheral surface of the dustproof member remains in contact with the surface of the track rail 11.

As will be described later in detail, each of the end-face dustproof brushes 25, 25 houses therein a brush member used for wiping away extraneous matters, such as ceramic powder, adhering to the surface of the track rail. The end-face dustproof brush assumes a C-shaped cross-sectional profile orthogonal to the longitudinal direction of the track rail 11. The dustproof brushes are attached, while straddling the track rail 11, to the outside of the respective dust proof members 24,24 with respect to the travel direction thereof with tip ends of the brush member remaining in contact with the surface of the track rail 11.

The side cover 22, the intermediate plate 23, the dustproof member 24, and the end-face dustproof brush 25 are entirely covered with a cover 26.

Reference Numeral 33 designates a side dustproof brush, which is attached to lower-end faces of skirt sections 28-1, 28-2 (see FIG. 4) of the moving block main body 21 with machine screws 34, 34. An end face of a brush section 33a remains in contact with the side surfaces of the track rail 11 in the longitudinal direction thereof, to thus prevent intrusion of extraneous matters into the moving block main body 21 from interstices between the inner side surfaces of the moving block 20 and the side surfaces of the track rail 11.

Figure 7:
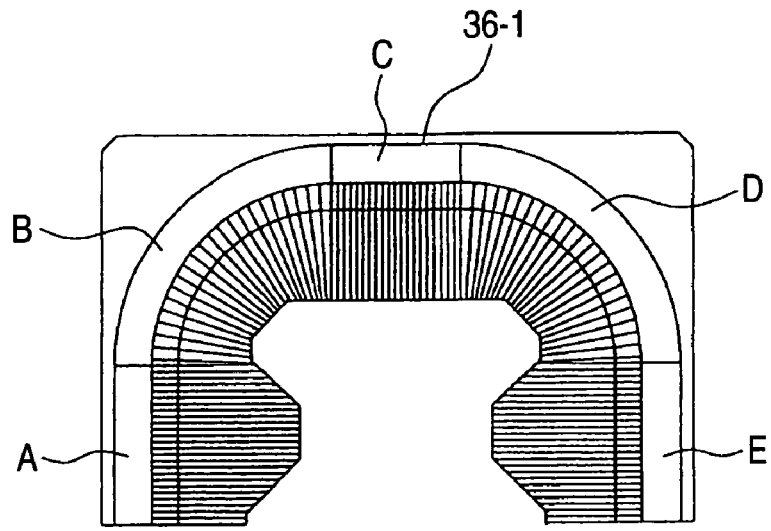
FIG. 7 is a view showing an example structure of an end-face dustproof brush of the moving block of the guide apparatus according to the present invention.
Figure 7:
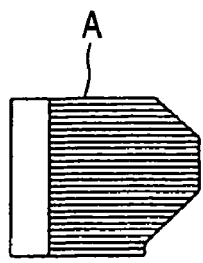
Figure 7:
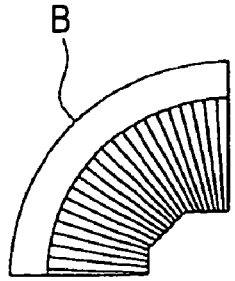
Figure 7:
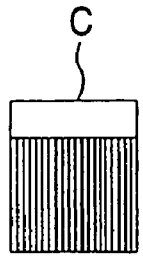
Figure 7:
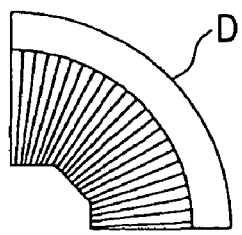
Figure 7:
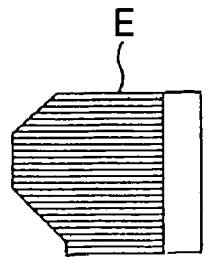
Figure 8:
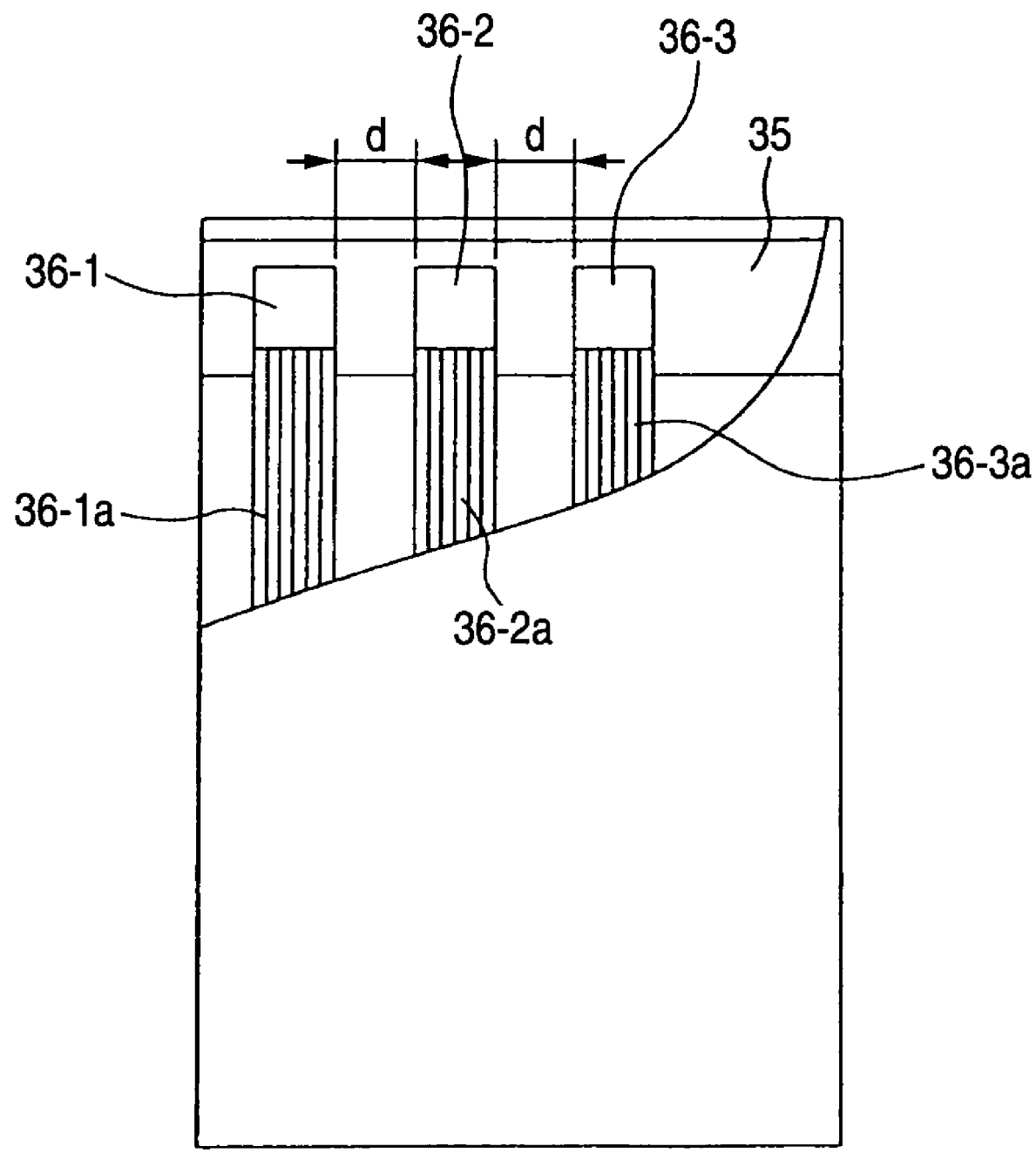
FIG. 8 is a fragmentary cutout side view showing the structure of the end-face dustproof brush of the guide apparatus according to the present invention.

FIGS. 7 and 8 are views showing an example structure of the end-face dustproof brush 25. FIG. 7(a) is a front view; FIGS. 7(b) to (f) are example structures of split brush bodies; and FIG. 8 is a fragmentary cutout side view. The end-face dustproof brush 25 is configured such that a plurality of (three in the drawing) brush members 36-1 to 36-3 are arranged at predetermined intervals "d," "d" within the brush casing 35.

Brush wires of a brush section 36-1a of the brush member 36-1 disposed at the outermost position on the moving block 20 with respect to the travel direction thereof assume a large wire diameter and high hardness (firm), and are disposed sparsely.

Brush wires of a brush section 36-3a of the innermost brush member 36-3 have a small wire diameter and low hardness (soft) and are disposed densely.

The wire diameter, hardness, and wire density of brush wire materials of a brush section 36-2a of the intermediate brush member 36-2 are made half their counterparts of the brush members 36-1 and those of the brush member 36-3.

As above, the plurality of brush members 36-1 to 36-3 are provided at predetermined intervals "d," "d" within the brush casing 35. Hence, comparatively-large, easily-adherable extraneous matters are eliminated by the preceding brush member 36-1. The extraneous matters which cannot have been eliminated by the brush member 36-1 are temporarily released into the space of the interval "d." The extraneous matters are then eliminated by the next brush member 36-2. The extraneous matters that have not yet been eliminated are further released in the space of the interval "d" and are eliminated by the next brush member 36-3. Most of the extraneous matters are thus eliminated.

The respective brush members 36-1 to 36-3 are arranged while wire diameter, hardness, and densities of brush wire materials of the brush members are changed. Hence, the comparatively-large, easily-adherable extraneous matters are eliminated by the outer brush member 36-1 which has a large wire diameter, hardness, and sparsely density. The extraneous matters that have not been eliminated by the brush member 36-1 are eliminated by the intermediate brush member 36-2. The extraneous matters that have not been eliminated by the brush member 36-2 are eliminated by the innermost soft brush member 36-3 having a small wire diameter and high density. Hence, extraneous matters, ceramic powder, or the like, can be efficiently eliminated.

As shown in FIG. 7, the brush member 36-1 is formed from the plurality of (five in the drawing) split brush bodies A to E conforming to the cross-sectional profile of the track rail 11.

Although omitted from the drawing, the brush members 36-2 and 36-3 each are also formed from five split brush members.

As mentioned above, the brush member 36 is formed from the plurality of split brush bodies A to E, whereby the tip ends of the brush wires can be brought into contact with the entire surface of the track rail 11 without fail even when the track rails have complicated cross-sectional profiles.

Figure 9:
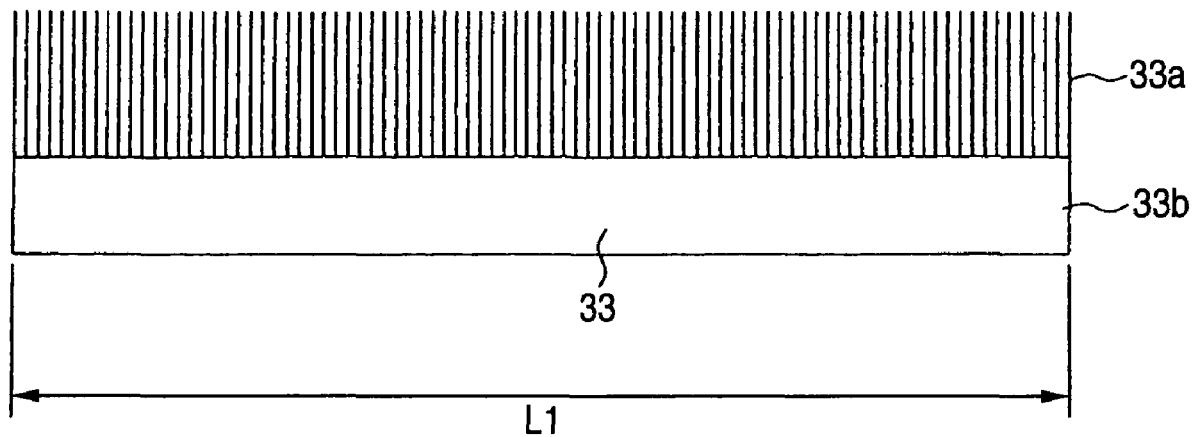
FIG. 9 is a view showing an example structure of a side dustproof brush of the guide apparatus according to the present invention.

FIG. 9 is a view showing an example structure of the side dustproof brush. A side dustproof brush 33 is formed by means of providing a long frame body 33b with a brush section 33a. The length L1 of the side dustproof brush is slightly longer than the total length L2 consisting of the length of the moving block main body 21 and the length of the side cover 22 attached to each end of the moving block body (L1>L2) (see FIG. 3).

The tip ends of the brush section 33a of the side dustproof brush 33 having such a structure contact (are brought into contact with) the side surface of the track rail 11, and a frame body 33b is attached to each of ends (lower ends) of skirt sections 28-1, 28-2 of the moving block body 21 with the machine screws 34. Further, both ends of the frame body 33b are fastened to the intermediate plates 23, 23 with the machine screws 37, 37 (see FIGS. 3 and 4).

As mentioned above, the side dustproof brushes 33 are provided, wherein the tip ends of the brush section 33a contact the longitudinal side surfaces of the track rail 11, to thus block the interstices between the longitudinal side surfaces of the track rail 11 and the longitudinal inner side surfaces of the moving block 20. As a result, the extraneous matters, which attempt to enter the interstices, can also be eliminated. Extraneous matters, which attempt to enter the interstices between the entire circumferential inner side surfaces of the moving block and the side surfaces of the track rail, can be prevented in conjunction with the end-face dustproof brush 25. Functions of the guide apparatus, such as smooth rolling of a plurality of rolling elements existing between the moving block 20 and the track rail 11 and smooth sliding between the dustproof members 24, 24 and the track rail 11 can be maintained in a superior condition.

The present invention can be subjected to various modes without being limited to the above embodiment.

For instance, the present embodiment has described the example where the balls 32 are used for the rolling elements. However, the rolling elements are not limited to balls but may be rollers. Although the above embodiment has illustrated the guide apparatus where the fixed track rail 11 is fixed and the moving block 20 moves. However, the moving block 20 may be fixed, and the track rail 11 may be moved.

Although the present invention has been described in detail and by reference to the specific embodiment, it is obvious to the persons in the art that the present invention can be subjected to various alterations and modifications without departing the spirit and scope of the present invention.

The present invention claims priority to Japanese Patent Application No. 2003-391215, filed on Nov. 20, 2003, which is incorporated herein by reference in its entirety.

INDUSTRIAL APPLICABILITY

According to the present invention, an end-face dustproof brush, which has a brush member whose tip end contacts a surface of the track rail and which eliminates extraneous matters adhering to the surface of the track rail by means of the brush member, is attached to outside of each of the side covers with respect to the direction of relative movement. Accordingly, extraneous matters having adhered to the surface of the track rail are wiped away by the brush member. There can be embodied a long-life, highly-reliable guide apparatus which exhibits dustproof performance and prevents intrusion of dust into the moving block in environments where great amounts of fine dust, such as gypsum and ceramic powder, are present and where any oil content is undesirable.

Since the present invention exhibits a unique effect, the industrial applicability is considerably large.

The present invention is not limited to the above-described embodiment.

The invention claimed is:

1. A guide apparatus, comprising:
    a track rail having rolling-element raceway surfaces formed along a longitudinal direction thereof,
    a moving block attached to the track rail by way of a plurality of rolling elements in a relatively-movable manner, the moving block having
        load rolling-element raceway surfaces forming load rolling-element raceway passages in conjunction with the rolling-element raceway surfaces,
        a moving block main body in which rolling-element clearance holes corresponding to the load rolling-element raceway surfaces are formed, and
        side covers attached to each end of the moving block main body with respect to the direction of relative movement, and
    an end-face dustproof brush attached to an outside of each of the side covers with respect to the direction of relative movement, the end-face dustproof brush having a plurality of brush members whose tip end contacts a surface of the track rail and which eliminates extraneous matters adhering to the surface of the track rail,
    wherein the end-face dustproof brush has a casing and the plurality of brush members are provided in the casing while being separated from each other at a given interval with reference to the direction of relative movement, and
    wherein, of the plurality of brush members of the end-face dust proof brush, brush wires of a brush member located outside with reference to the direction of relative movement have a larger wire diameter, a higher hardness, and a lower arrangement density than brush wires of a brush member located inside with reference to the direction of relative movement.

2. The guide apparatus according to claim 1, wherein each of the plurality of brush members of the end-face dustproof brush conforms to a cross-sectional profile of the track rail, and each of the plurality of brush members is formed from a plurality of split brush bodies so that tip ends of the brush bodies can contact the surface of the track rail.

3. The guide apparatus according to claim 2, wherein a first part of said end-face dustproof brush is substantially orthogonal to a second part of said end-face dustproof brush.

4. The guide apparatus according to claim 2, wherein the plurality of split brush members includes:
    a first split brush member, tip ends of brush wires thereof contacting with a upper surface of the track rail;
    a second split brush member, tip ends of brush wires thereof contacting with a first side surface of the track rail; and
    a third split brush member, tip ends of brush wires thereof contacting with a second side surface of the track rail.

5. The guide apparatus according to claim 1,
    wherein an accessory member is provided between the end-face dustproof brush and the side cover.

6. The guide apparatus according to claim 5, wherein the accessory member is another seal member.

7. The guide apparatus according to claim 5, wherein a first part of said end-face dustproof brush is substantially orthogonal to a second part of said end-face dustproof brush.

8. The guide apparatus according to claim 5, wherein each of said plurality of brush members includes:
    a first split brush member, tip ends of brush wires thereof contacting with a upper surface of the track rail;
    a second split brush member, tip ends of brush wires thereof contacting with a first side surface of the track rail; and
    a third split brush member, tip ends of brush wires thereof contacting with a second side surface of the track rail.

9. The guide apparatus according to claim 1,
    wherein the moving block main body is provided with a side dustproof brush whose tip ends contact a longitudinal side surface of the track rail and which closes clearance between the side surface of the track rail and a longitudinal inner side surface of the moving block.

10. The guide apparatus according to claim 9, wherein a first part of said end-face dustproof brush is substantially orthogonal to a second part of said end-face dustproof brush.

11. The guide apparatus according to claim 9, wherein each of said plurality of brush members includes:
   a first split brush member, tip ends of brush wires thereof contacting with a upper surface of the track rail;
   a second split brush member, tip ends of brush wires thereof contacting with a first side surface of the track rail; and
   a third split brush member, tip ends of brush wires thereof contacting with a second side surface of the track rail.

12. The guide apparatus according to claim 1, wherein a first part of said end-face dustproof brush is substantially orthogonal to a second part of said end-face dustproof brush.

13. The guide apparatus according to claim 1, wherein each of said plurality of brush members includes:
   a first split brush member, tip ends of brush wires thereof contacting with a upper surface of the track rail;
   a second split brush member, tip ends of brush wires thereof contacting with a first side surface of the track rail; and
   a third split brush member, tip ends of brush wires thereof contacting with a second side surface of the track rail.

* * * * *